United States Patent
Ichioka et al.

(10) Patent No.: US 9,002,165 B2
(45) Date of Patent: Apr. 7, 2015

(54) OPTICAL WAVEGUIDE DEVICE

(75) Inventors: Masayuki Ichioka, Tokyo (JP); Mitsuru Sakuma, Tokyo (JP); Junichiro Ichikawa, Tokyo (JP)

(73) Assignee: Sumitomo Osaka Cement Co., Ltd. (JP)

( * ) Notice: Subject to any disclaimer, the term of this patent is extended or adjusted under 35 U.S.C. 154(b) by 0 days.

(21) Appl. No.: 14/114,449

(22) PCT Filed: Apr. 27, 2012

(86) PCT No.: PCT/JP2012/061350
§ 371 (c)(1),
(2), (4) Date: Oct. 28, 2013

(87) PCT Pub. No.: WO2012/147914
PCT Pub. Date: Nov. 1, 2012

(65) Prior Publication Data
US 2014/0050440 A1  Feb. 20, 2014

(30) Foreign Application Priority Data
Apr. 28, 2011  (JP) .................................. 2011-102391

(51) Int. Cl.
*G02B 6/10*  (2006.01)
*G02B 6/12*  (2006.01)
(Continued)

(52) U.S. Cl.
CPC ................ *G02B 6/12* (2013.01); *G02F 1/0305* (2013.01); *G02F 1/0356* (2013.01);
(Continued)

(58) Field of Classification Search
CPC ............ G02B 6/138; G02B 2006/1204; G02F 1/2257

USPC .................................................. 385/131, 141
See application file for complete search history.

(56) References Cited

U.S. PATENT DOCUMENTS

| 4,750,800 A | 6/1988 | Fournier et al. |
| 2001/0026665 A1 | 10/2001 | Ando et al. |
| 2009/0224851 A1 | 9/2009 | Feiertag et al. |

FOREIGN PATENT DOCUMENTS

| EP | 0331233 A2 | 9/1989 |
| EP | 1657588 A1 | 5/2006 |

(Continued)

OTHER PUBLICATIONS

Herman, "Integrated Optics With Liquid Crystals", Chalmers University of Technology, 2000.*

(Continued)

*Primary Examiner* — Ryan Lepisto
(74) *Attorney, Agent, or Firm* — Merchant & Gould P.C.

(57) ABSTRACT

Provided is an optical waveguide device capable of reducing stress that occurs inside an optical waveguide substrate due to a difference in a coefficient of thermal expansion. The optical waveguide device (10) includes an optical waveguide substrate (11) having a thickness of 30 μm or less, and a liquid crystal polymer substrate (12) which holds the optical waveguide substrate (11) and has permittivity lower than that of the optical waveguide substrate (11). The optical waveguide substrate (11) and the liquid crystal polymer substrate (12) are bonded to each other by an adhesive layer (14). Coefficients of thermal expansion of the optical waveguide substrate (11) and the liquid crystal polymer substrate (12) have anisotropy in each substrate plane, and a relative direction between the optical waveguide substrate (11) and the liquid crystal polymer substrate (12) is adjusted in such a manner that anisotropic axial directions of the optical waveguide substrate (11) and anisotropic axial directions the liquid crystal polymer substrate (12) are aligned.

3 Claims, 3 Drawing Sheets

(51) Int. Cl.
 *G02F 1/03* (2006.01)
 *G02F 1/035* (2006.01)
(52) U.S. Cl.
 CPC ........ *G02F 2201/07* (2013.01); *G02F 2201/54* (2013.01); *G02F 2203/21* (2013.01); *G02F 2202/022* (2013.01); *G02F 2202/28* (2013.01)

(56) References Cited

FOREIGN PATENT DOCUMENTS

| JP | A-63-133104 | 6/1988 | | |
|---|---|---|---|---|
| JP | A-06-504853 | 6/1994 | | |
| JP | A-11-174261 | 7/1999 | | |
| JP | A-2003-215519 | 7/2003 | | |
| JP | A-2003-258364 | 9/2003 | | |
| JP | A-2003-318478 | 11/2003 | | |
| JP | A-2004-309683 | 11/2004 | | |
| JP | A-2005-221584 | 8/2005 | | |
| JP | 2009-210633 | * | 9/2009 | ............... G02B 6/12 |
| JP | A-2009-210633 | 9/2009 | | |
| JP | A-2009-210634 | 9/2009 | | |
| WO | WO 92/06395 A1 | 4/1992 | | |

OTHER PUBLICATIONS

International Search Report for International Patent Application No. PCT/JP2012/061350 (mailed Jun. 5, 2012).
Yanagihara, "Progress of new functional polymers," *Bulletin of the Japan Electronics Materials Society,* 18:96-100 (1986).
"Liquid crystal polymer," *Plastics* (45)4:58-59 (1994).
European Search Report for European Patent Application No. 12777019.6 (mailed Nov. 14, 2014).

* cited by examiner

PRIOR ART

OPTICAL WAVEGUIDE DEVICE

This application is a U.S. National Stage Application under 35 U.S.C. §371 of International Patent Application No. PCT/JP2012/061350 filed 27 Apr. 2012, which claims the benefit of priority to Japanese Patent Application No. 2011-102391 filed 28 Apr. 2011, the disclosures of all of which are hereby incorporated by reference in their entireties. The International Application was published in Japanese on 1 Nov. 2012 as WO 2012/147914.

TECHNICAL FIELD

The present invention relates to an optical waveguide device, and more specifically to, an optical modulator.

BACKGROUND

Recently, higher speed and capacity of an optical communication system has been progressing, and thus using a communication speed of 40 gigabit/second or higher per one wavelength has been considered practical. According to this, band-widening of the optical modulator, which is a basic component, has been demanded. A traveling-wave type optical modulator is an optical modulator that modulates optical waves by an interaction between optical waves that travel through the optical waveguide and microwaves that travel through an electrode provided along the optical waveguide, the interaction being attributed to an electro-optical effect, and the band-broadening is realized by speed matching between the optical waves and the microwaves. As a method of realizing the speed matching, a configuration in which an electrode is formed on a low-permittivity buffer layer provided on an optical waveguide substrate has been used in the related art. However, in this configuration, since an electric field that is applied to the optical waveguide decreases due to the presence of the buffer layer, there is a disadvantage that voltage reduction of a drive voltage may not be realized.

Figure 5:
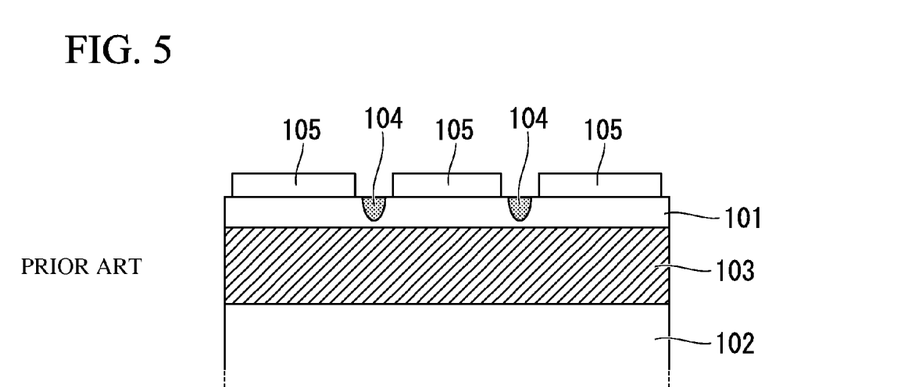
FIG. 5 is a cross-sectional configuration view of a travelling-wave type optical modulator of the related art.

To correct the disadvantage, there is suggested a travelling-wave type optical modulator in which the optical waveguide substrate is made to be thin as shown in FIG. 5 (for example, refer to PTL 1). In FIG. 5, an optical waveguide substrate 101 in which an optical waveguide 104 is formed is fixed and held to a holding substrate 102 by an adhesive layer 103. The thickness of the optical waveguide substrate 101 is approximately 10 µm or less, and is smaller than that of a common substrate (for example, thickness of 0.5 mm). As the adhesive layer 103, a layer having permittivity lower than that of the optical waveguide substrate 101 is used, and the thickness of the adhesive layer 103 is made to be sufficiently large (for example, 10 µm to 200 µm) in order for leakage of an electric field applied from an electrode 105 to the adhesive layer 103 to increase. In this configuration, the electric field from the electrode 105 is leaked to the inside of the adhesive layer 103 having a low dielectric constant, and thus an equivalent refractive index (a value thereof is larger than an equivalent refractive index with respect to optical wave) with respect to microwaves becomes smaller compared to a case in which the thickness of the optical waveguide substrate 101 is large. In this manner, since a difference in a value of the equivalent refractive index decreases, it becomes close to a state in which the speeds of the optical waves and the microwave are matched to each other, whereby band-broadening is realized. Along with this, in this configuration, the speed matching becomes possible without providing a buffer layer on the optical waveguide substrate 101, and thus the intensity of the electric field applied to the optical waveguide 104 does not decrease, and the voltage reduction of the drive voltage may be realized at the same time.

However, in the configuration shown in FIG. 5, since the thickness of the adhesive layer 103 is large, the following problems occur. First, if the thickness of the adhesive layer is large, the bonding strength thereof is apt to decrease. Second, since the temperature is increased by ultraviolet irradiation or heating and lowered after being cured, stress occurs during the curing of the adhesive, and if the adhesive layer is thick, occurrence of the stress is apt to increase. Third, manufacturing cost is increased, since a process for forming a thick adhesive layer involves difficult manufacturing steps, such as correcting of parallelism of a substrate and prevention of dripping.

As a technology of coping with these problems, there is suggested a structure of using a resin substrate as disclosed in PTL 2 and PTL 3. According to this structure, since a thick adhesive layer is not used, there are merits in a process or characteristic aspect such as ease of carrying out the correction of parallelism during bonding and a small effect due to shrinkage of an adhesive during curing.

CITATION LIST

Patent Literature

[PTL 1] Japanese Laid-open Patent Application Publication No. 2003-215519
[PTL 2] Japanese Laid-open Patent Application Publication No. 2009-210633
[PTL 3] Japanese Laid-open Patent Application Publication No. 2009-210634

SUMMARY OF INVENTION

Technical Problem

In the structure of using the resin substrate, which is disclosed in PTL 2 and PTL 3, it is preferable that a coefficient of thermal expansion (coefficient of linear expansion, the same shall apply hereinafter) of the resin substrate become a value close to a coefficient of thermal expansion of the optical waveguide substrate in consideration of a manufacturing process aspect and a device characteristic aspect. Here, generally, the coefficient of thermal expansion of the resin is isotropic, but a material having an anisotropic coefficient of thermal expansion may be used for the optical waveguide substrate in some cases. For example, in a case of an LN substrate to be described later, the coefficient of thermal expansion is 2 ppm/° C. in a Z-axis direction and 16 ppm/° C. in an X-direction or Y-direction. Therefore, in a case of using the LN substrate of X-cut or Y-cut instead of Z-cut, large anisotropy is present in a substrate plane, and it is difficult to make the coefficients of thermal expansion of the LN substrate and the resin substrate equal to each other in respective directions in the substrate plane.

Therefore, in the optical waveguide device of the related art, there is a problem in that stress caused by a difference in a coefficient of thermal expansion occurs inside the optical waveguide substrate, and thus device characteristics may deteriorate. In addition, this stress may be reduced by making an adhesive layer between the optical waveguide substrate and the resin substrate thin, but it is difficult to make the stress completely zero. Therefore, defective product (shift of an initial operation point, cracking, and the like) occurs in a constant ratio during a process of bonding (gluing) the optical waveguide substrate and the resin substrate. The generation of the defective product becomes significant along with thinning of the optical waveguide substrate.

The invention has been made in consideration of the above-described circumstances, and an object thereof is to provide an optical waveguide device capable of reducing stress that occurs inside an optical waveguide substrate due to a difference in a coefficient of thermal expansion.

Solution to Problem

The invention has been made to solve the above-described problem. According to an aspect of the invention, there is provided an optical waveguide device including an optical waveguide substrate having a thickness of 30 μm or less, and a holding substrate that holds the optical waveguide substrate. The optical waveguide substrate and the holding substrate are bonded to each other by an adhesive layer. The holding substrate is a substrate formed from a liquid crystal polymer having permittivity lower than that of the optical waveguide substrate. Coefficients of thermal expansion of the optical waveguide substrate and the holding substrate have anisotropy in each substrate plane, and the relative direction between the optical waveguide substrate and the holding substrate is adjusted in such a manner that anisotropic axial directions of the optical waveguide substrate and anisotropic axial directions of the holding substrate are aligned.

In addition, in the optical waveguide device of the invention, the relative direction between the optical waveguide substrate and the holding substrate may be adjusted in such a manner that each of the axes with a larger coefficient of thermal expansion and with a smaller coefficient of thermal expansion in the anisotropic axial directions of the optical waveguide substrate are aligned with each of the axes with a larger coefficient of thermal expansion and with a smaller coefficient of thermal expansion in the anisotropic axial directions of the holding substrate.

In addition, in the optical waveguide device of the invention, the holding substrate may be attached to a housing formed from a resin.

In addition, in the optical waveguide device of the invention, a coefficient of thermal expansion of the holding substrate formed from the liquid crystal polymer on a side coming into contact with the housing may be substantially the same as a coefficient of thermal expansion of the housing.

Advantageous Effects of Invention

According to the invention, stress that occurs inside the optical waveguide substrate due to a difference in coefficient of thermal expansion may be reduced.

DESCRIPTION OF EMBODIMENTS

Hereinafter, preferred embodiments of the invention will be described in detail with reference to the attached drawings.

First Embodiment

Figure 1:
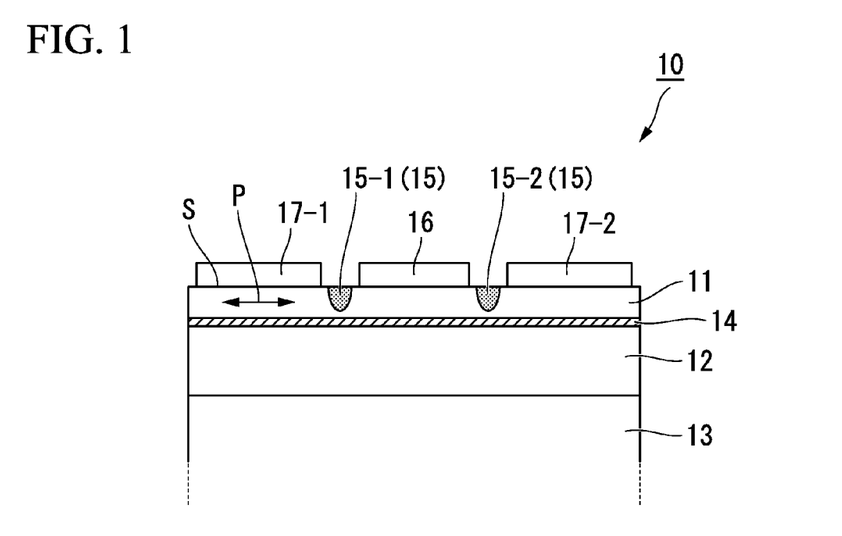
FIG. 1 is a cross-sectional configuration view of a travelling-wave type optical modulator according to a first embodiment of the invention.
Figure 2:
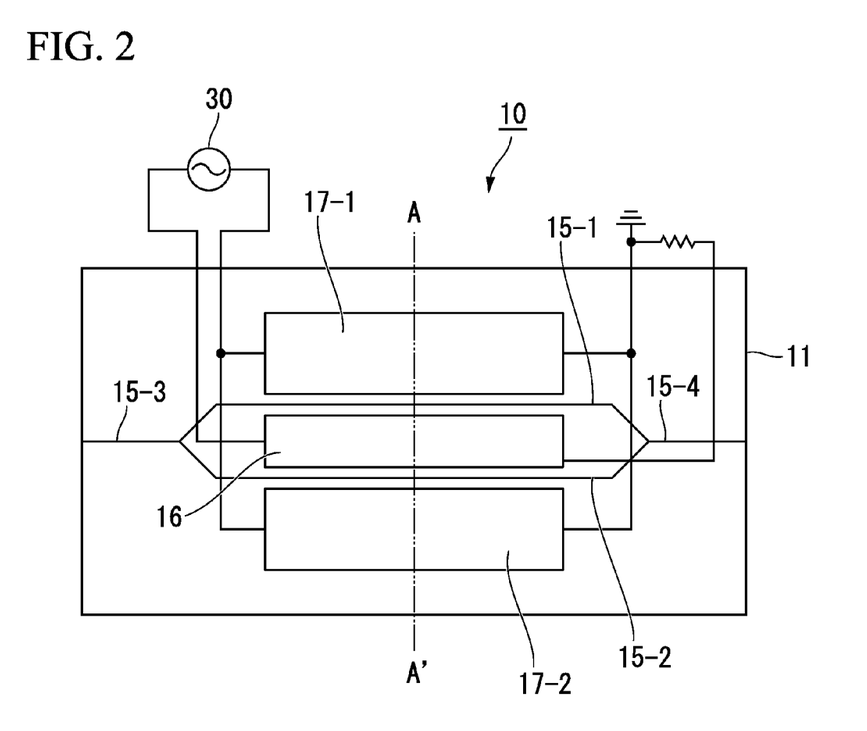
FIG. 2 is a planar configuration view of the travelling-wave type optical modulator according to the first embodiment of the invention.

FIGS. 1 and 2 show a cross-sectional configuration view and a planar configuration view of a traveling-wave type optical modulator 10 that is an optical waveguide device according to a first embodiment of the invention, respectively. The cross-sectional configuration view of FIG. 1 illustrates a shape that is cut along a line A-A' of the planar configuration view of FIG. 2.

In FIGS. 1 and 2, an optical modulator 10 includes an optical waveguide substrate 11 in which a Mach-Zehnder optical waveguide 15 is formed, a holding substrate 13 that holds the optical waveguide substrate 11, a liquid crystal polymer substrate 12 that is interposed between the optical waveguide substrate 11 and the holding substrate 13, an adhesive layer 14 that bonds and fixes the optical waveguide substrate 11 and the liquid crystal polymer substrate 12 to each other, and a signal electrode 16 and ground electrodes 17-1 and 17-2 that are formed on the optical waveguide substrate 11.

The optical waveguide substrate 11 is an X-cut substrate that is cut from a mother crystal having an electro-optical effect in such a manner that a main axis P thereof and a substrate surface S are parallel with each other, and for example, a lithium niobate (LN) substrate, a lithium carbonate (LT) substrate, and the like may be used as the optical waveguide substrate 11. The Mach-Zehnder optical waveguide 15 including an input waveguide 15-3, diverged optical waveguides 15-1 and 15-2, and an output waveguide 15-4 is formed in the X-cut optical waveguide substrate 11 in such a manner that the main axis P is perpendicular to the diverged optical waveguides 15-1 and 15-2 (that is, in FIG. 1, the main axis P is located in a paper plane). The upper limit of the thickness of the optical waveguide substrate 11 may be arbitrarily selected, but the upper limit may be, for example, 30 μm or less, more preferably 20 μm or less, and still more preferably 10 μm or less. The lower limit of the thickness of the optical waveguide substrate 11 may be arbitrarily selected, but the lower limit is preferably approximately 1 μm or more. In this manner, when the optical waveguide substrate 11 is made to be thin, an equivalent refractive index with respect to microwaves that are excited by the electrodes 16, 17-1, and 17-2 and travel inside the optical waveguide substrate 11 decreases, and thus a difference with an equivalent refractive index with respect to optical waves that travel through the diverged optical waveguides 15-1 and 15-2 decreases. According to this, it enters a state in which speed matching between the optical waves and the microwaves is realized, or a state in which the difference in speed is small, and thus band-broadening of the optical modulator 10 is realized.

Hereinafter, it is assumed that an LN substrate is used as the optical waveguide substrate 11. A coefficient of thermal expansion (hereinafter, referred to as "coefficient of linear expansion") of the LN substrate is 2 ppm/° C. in the Z-axis (main axis P) direction, and 16 ppm/° C. in the X-direction (the vertical direction in the drawings, that is, a direction perpendicular to the substrate plane) or the Y-direction (a direction perpendicular to a paper plane in the drawings, that is, the propagation direction of the waveguide).

The liquid crystal polymer substrate 12 is a substrate formed from a resin having characteristics in which permittivity (a real part) is lower than permittivity of the optical waveguide substrate 11, and is used to make the equivalent refractive index with respect to the microwave small as described above. The permittivity is preferably 5 or less, and more preferably 3 or less. It is preferable that an imaginary part of complex permittivity be small so as to suppress a loss of the microwaves.

Here, a liquid crystal polymer has coefficients of thermal expansion different from each other between a flowing direction of a resin during molding and a direction perpendicular to the flowing direction of the resin, and the coefficients of thermal expansion in the two directions may be controlled by a resin flowing rate or a shape of a resin flowing port. Ideally, it is preferable that the coefficient of thermal expansion in each axial direction of the liquid crystal polymer substrate 12 be substantially the same as the coefficient of thermal expansion in each axial direction of the optical waveguide substrate 11. However, actually, a liquid crystal polymer having such a physical property is not known. Therefore, in the embodiment, the coefficients of thermal expansion of the liquid crystal polymer substrate 12 in two axial directions perpendicular to each other are adjusted to have a value close to the ratio of coefficients of thermal expansion of the optical waveguide substrate 11 in two axial directions (two axes including the Z-axis and the X-axis, or two axes including the Z-axis and the Y-axis) that are perpendicular to each other. As a specific example, when assuming that the optical waveguide substrate 11 (LN substrate) has the above-described coefficients of thermal expansion (a value of the ratio is 8), the coefficients of thermal expansion of the liquid crystal polymer substrate 12 are adjusted to be 7 ppm/° C. in a resin flowing direction during molding and to be 60 ppm/° C. in a direction perpendicular to the resin flowing direction by using a polyphenylene sulfide-based resin (permittivity=4.6). A relative direction of the liquid crystal polymer substrate 12 with respect to the optical waveguide substrate 11 is set in such a manner that the direction in which the coefficient of thermal expansion is 7 ppm/° C. is parallel with the Z-axis (main axis P) of the optical waveguide substrate 11 (LN substrate) and the direction in which the coefficient of thermal expansion is 60 ppm/° C. is parallel with the X-axis direction or the Y-axis direction of the optical waveguide substrate 11 (LN substrate). According to this configuration, stress that occurs inside the optical waveguide substrate 11 due to a difference in a coefficient of thermal expansion may be reduced, and thus stability in characteristics accompanying a temperature variation may be improved.

The ratio of the coefficients of thermal expansion of the liquid crystal polymer substrate 12 in the two axial directions may not be completely equal to the ratio of the coefficients of thermal expansion of the two axial directions of the optical waveguide substrate 11, and a difference between the ratios of the coefficients of thermal expansion may be present within a range capable of obtaining characteristics that are not problematic for practical use.

It is preferable that the difference in a coefficient of thermal expansion between the optical waveguide substrate 11 and the liquid crystal polymer substrate 12 be small, but it is most important for the directions of the biaxial anisotropy of the coefficient of thermal expansion to be aligned (to overlap). It is more preferable to make the difference in a coefficient of thermal expansion between the optical waveguide substrate 11 and the liquid crystal polymer substrate 12 small in the axial direction of the two axes with a larger coefficient of thermal expansion.

The thickness of the liquid crystal polymer substrate 12 is made to be sufficiently large, for example, 50 μm or more, in order for an electric field of the microwaves generated by the electrodes 16, 17-1, and 17-2 to be largely leaked to the inside of the liquid crystal polymer substrate 12. According to this, the equivalent refractive index with respect to the microwaves may be made to be small. There is no particular limitation to the upper limit of the thickness. In addition, in the liquid crystal polymer, a slight distribution of the coefficient of thermal expansion in a plate thickness direction may be present depending on molding conditions of the liquid crystal polymer. However, if the anisotropy of the coefficient of thermal expansion of the overall liquid crystal polymer substrate 12 is close to that of the optical waveguide substrate 11, even when a local distribution of the coefficient of thermal expansion is present at the inside of the liquid crystal polymer substrate 12, there is no problem with a characteristic aspect of a device.

The optical waveguide substrate 11 and the liquid crystal polymer substrate 12 are bonded and fixed to each other by the adhesive layer 14. As an adhesive that forms the adhesive layer 14, an ultraviolet-curable adhesive that is cured by irradiation of ultraviolet rays, or thermally curable adhesive that is cured by heating may be used. With regard to the adhesive, it is preferable that all of permittivity and an imaginary part of complex permittivity be low, for example, an acrylic adhesive and an epoxy-based adhesive are used. When comparing these adhesives, generally, the permittivity and the imaginary part of complex permittivity of the acrylic adhesive are lower than that of the epoxy-based adhesive, and the bonding strength and mechanical strength of the epoxy-based adhesive are higher than that of the acrylic adhesive.

It is preferable that the thickness of the adhesive layer 14 be sufficiently small in consideration of necessity for improving reliability of the optical modulator 10. For example, the adhesive layer 14 is formed with a thickness of 20 μm or less, preferably 9 μm or less, and more preferably 1 μm or less. When the thickness exceeds 30 μm, as described above, the correcting of parallelism becomes difficult during bonding. In addition, generally, when an adhesive layer is formed with a small thickness, the bonding strength increases. Accordingly, when the adhesive layer 14 is made to be thin, the optical waveguide substrate 11 and the liquid crystal polymer substrate 12 may be bonded and fixed to each other with strength sufficient for a certain degree having no problem with a reliability aspect. In addition, since the temperature is increased by ultraviolet irradiation or heating, and lowered after being cured, stress occurs during the curing of the adhesive. However, as long as the thickness of the adhesive layer 14 is small, and the directions of the biaxial anisotropy of the coefficient of thermal expansion are aligned with each other, the occurrence of stress can be reduced, and thus a yield rate during bonding may be improved. With regard to the bonding, the optical waveguide substrate 11 and the liquid crystal polymer substrate 12 are preferably subjected to a washing treatment or a surface treatment by an appropriate method in order for bonding strength to be sufficiently exhibited.

Effect of the thickness of the adhesive layer 14 on a thermal drift (a variation in a drive voltage at a measurement temperature of −40° C. to 85° C.) was measured, and the following results were obtained. The coefficient of thermal expansion of the liquid crystal polymer substrate 12 that was used for the evaluation is 7 ppm/° C. in the Z-axis direction and 60 ppm/° C. in the X-direction and the Y-direction.

| Thickness of the adhesive layer (μm) | Thermal drift (V) |
| --- | --- |
| 1 | 0.3 |
| 2 | 0.5 |
| 3 | 0.4 |
| 4 | 0.1 |
| 5 | 0.4 |

On the other hand, the same measurement was carried out with respect to a device having a structure in which an acrylic resin substrate (permittivity=4.0) is employed (PTL 2 and PTL 3) instead of the liquid crystal polymer substrate 12, and the following results were obtained.

| Thickness of the adhesive layer (μm) | Thermal drift (V) |
| --- | --- |
| 3 | 2.1 |
| 4 | 2.9 |
| 5 | 3.0 |

A general permitted value of the thermal drift is 3.0 V or less. It appears that the resulting characteristics were within a permitted range when using conventional resin substrates (acrylic substrates) though, satisfactory characteristics may only be obtained in a structure using the liquid crystal polymer substrate 12.

The holding substrate 13 is a substrate that holds the optical waveguide substrate 11 through the liquid crystal polymer substrate 12. The thickness of the holding substrate 13 is made to be sufficiently large so as to reliably hold the optical waveguide substrate 11, and is set to, for example, 200 μm or more, and preferably approximately 0.5 mm to 1.0 mm. As a material of the holding substrate 13, a material having a coefficient of thermal expansion that is close to a coefficient of thermal expansion of the optical waveguide substrate 11 is used in order for stress not to occur inside the optical waveguide substrate 11, or in order for the stress to be reduced, when the environmental temperature varies. Furthermore, it is more preferable that the optical waveguide substrate 11 and the holding substrate 13 be formed from the same material. For example, in a case where the optical waveguide substrate 11 is an LN substrate, quartz, alumina, or an LN substrate having the same crystal orientation as the optical waveguide substrate 11 may be used as a material of the holding substrate 13.

In the invention, a method of fixing the liquid crystal polymer substrate 12 and the holding substrate 13 to each other is not particularly limited, and for example, a bonding and fixing method using the same adhesive as the adhesive layer 14, a method in which the liquid crystal polymer substrate 12 is formed from a material having viscosity by heating, and the liquid crystal polymer substrate 12 is heated and fixed to the holding substrate 13, a method of mechanically fixing (for example, screw fastening) the liquid crystal polymer substrate 12 and the holding substrate 13, and the like are applicable to the fixing method.

The Mach-Zehnder optical waveguide 15 may be prepared by, for example, a method in which a metal such as titanium (Ti) is allowed to thermally diffuse to the inside of the optical waveguide substrate 11, a method in which atoms (in a case of the LN substrate, lithium (Li) atoms) inside the optical waveguide substrate 11 is exchanged with protons, a method in which the optical waveguide substrate 11 is formed in a ridge shape, and light is guided to the ridge portion, and the like.

The respective electrodes 16, 17-1, and 17-2 that are formed on the optical waveguide substrate 11 are electrodes that allow microwaves to travel inside the optical waveguide substrate 11 and modulate optical waves propagating inside the diverged optical waveguides 15-1 and 15-2. The signal electrode 16 is disposed between the diverged optical waveguides 15-1 and 15-2, and the ground electrodes 17-1 and 17-2 are disposed to face the signal electrode 16 with the diverged optical waveguides 15-1 and 15-2 being interposed therebetween, respectively. According to this disposition, at the inside of the diverged optical waveguides 15-1 and 15-2, an electric field of the microwaves has a main component in the direction of the main axis P. As described, the speed matching is configured to be realized by the liquid crystal polymer substrate 12 provided on a lower side of the optical waveguide substrate 11, and thus the respective electrodes 16, 17-1, and 17-2 are configured to be directly formed on the optical waveguide substrate 11. Accordingly, voltage reduction of a drive voltage may be realized without a decrease in intensity of the electric field of the microwaves applied to the diverged optical waveguides 15-1 and 15-2. A modulation voltage that is input to the respective electrodes 16, 17-1, and 17-2 is supplied from an external high-frequency power supply 30.

Second Embodiment

Figure 3:
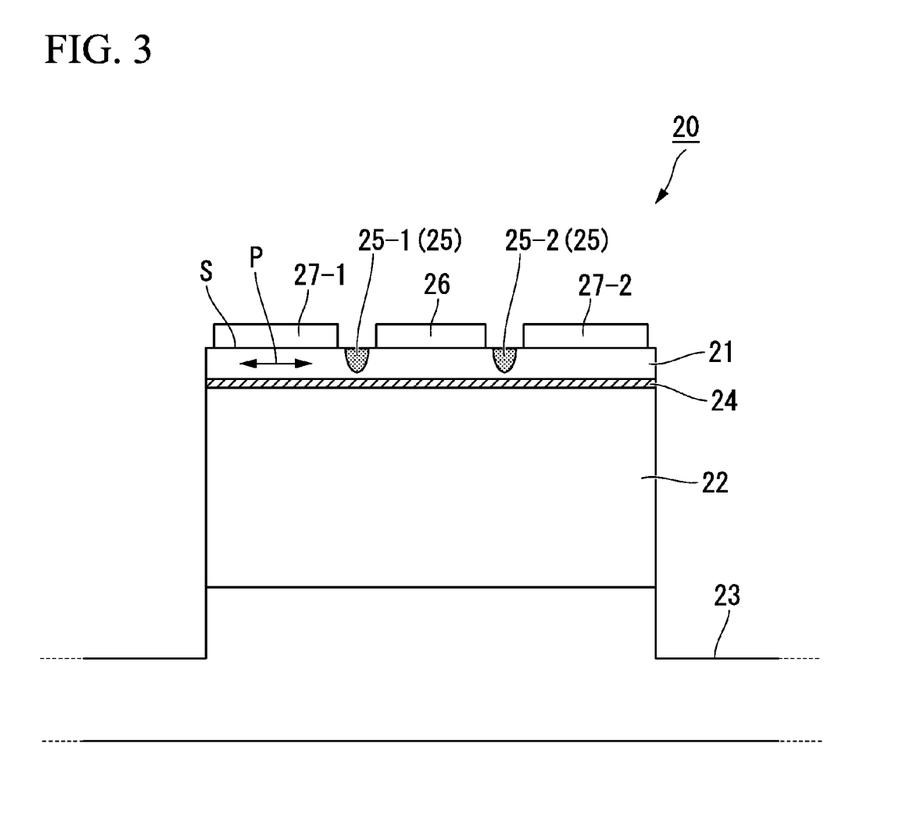
FIG. 3 is a cross-sectional configuration view of a travelling-wave type optical modulator according to a second embodiment of the invention.
Figure 4:
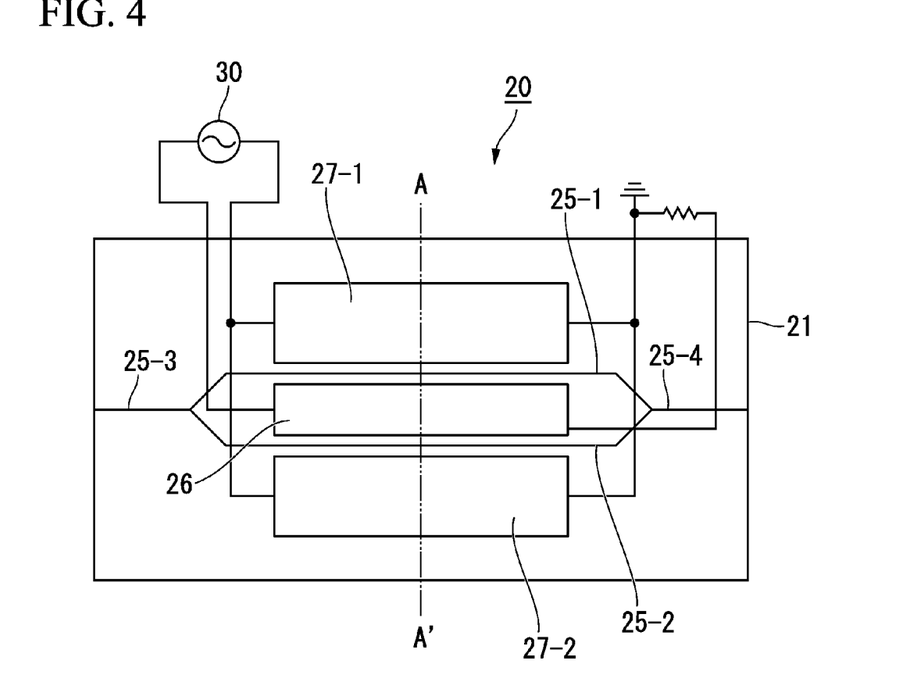
FIG. 4 is a planar configuration view of the travelling-wave type optical modulator according to the second embodiment of the invention.

FIGS. 3 and 4 show a cross-sectional configuration view and a planar configuration view of a travelling-wave type optical modulator 20 that is an optical waveguide device according to a second embodiment of the invention, respectively. The cross-sectional configuration view of FIG. 3 illustrates a shape that is cut along a line A-A' of the planar configuration view of FIG. 4.

In FIGS. 3 and 4, the optical modulator 20 includes an optical waveguide substrate 21 in which a Mach-Zehnder optical waveguide 25 is formed, a liquid crystal polymer substrate 22 that is a holding substrate that holds the optical waveguide substrate 21, an adhesive layer 24 that bonds and fixes the optical waveguide substrate 21 and the liquid crystal polymer substrate 22 to each other, a signal electrode 26 and ground electrodes 27-1 and 27-2 which are formed on the optical waveguide substrate 21, and a package housing 23 which fixes the liquid crystal polymer substrate 22.

The optical waveguide substrate 21 is an X-cut substrate that is cut from a mother crystal having an electro-optical effect in such a manner that a main axis P thereof and a substrate surface S are parallel with each other, and for example, a lithium niobate (LN) substrate, a lithium carbonate (LT) substrate, and the like may be used as the optical waveguide substrate 21. The Mach-Zehnder optical waveguide 25 including an input waveguide 25-3, diverged optical waveguides 25-1 and 25-2, and an output waveguide 25-4 is formed in the X-cut optical waveguide substrate 21 in such a manner that the main axis P is perpendicular to the diverged optical waveguides 25-1 and 25-2 (that is, in FIG. 3, the main axis P is located in a paper plane). The upper limit of the thickness of the optical waveguide substrate 21 may be arbitrarily selected, but the upper limit may be, for example, 30 μm or less, more preferably 20 μm or less, and still more preferably 10 μm or less. The lower limit of the thickness of the optical waveguide substrate 21 may be arbitrarily selected, but the lower limit is preferably approximately 1 μm or more. In this manner, when the optical waveguide substrate 21 is made to be thin, an equivalent refractive index with respect to microwaves that are excited by the electrodes 26, 27-1, and 27-2 and travel inside the optical waveguide substrate 21 decreases, and thus a difference with an equivalent refractive index with respect to optical waves that travel through the diverged optical waveguides 25-1 and 25-2 decreases. According to this, it enters a state in which speed matching between the optical waves and the microwaves is realized, or a state in which a difference in speed is small, and thus band-broadening of the optical modulator 20 is realized.

Hereinafter, it is assumed that an LN substrate is used as the optical waveguide substrate 21. The coefficient of thermal expansion of the LN substrate is 2 ppm/° C. in the Z-axis (main axis P) direction, and 16 ppm/° C. in the X-direction (the vertical direction in the drawings, that is, a direction perpendicular to the substrate plane) or the Y-direction (a direction perpendicular to a paper plane in the drawings, that is, a propagation direction of the waveguide).

As described above, the liquid crystal polymer substrate 22 is a substrate that is used to the equivalent refractive index with respect to the microwave small and to hold the optical waveguide substrate 21. As a material of the liquid crystal polymer substrate 22, a material having characteristics in which permittivity (a real part) is lower than permittivity of the optical waveguide substrate 21 is used. It is preferable that an imaginary part of complex permittivity be small so as to suppress a loss of microwaves.

Here, a liquid crystal polymer has coefficients of thermal expansion different from each other between a flowing direction of a resin and a direction perpendicular to the flowing direction during molding, and the coefficients of thermal expansion in the two directions may be controlled by a resin flowing rate or a shape of a resin flowing port. Ideally, it is preferable that the coefficient of thermal expansion in each axial direction of the liquid crystal polymer substrate 12 be substantially the same as the coefficient of thermal expansion in each axial direction of the optical waveguide substrate 11. However, actually, a liquid crystal polymer having such a physical property is not known. Therefore, in the embodiment, the coefficients of thermal expansion of the liquid crystal polymer substrate 22 in two axial directions perpendicular to each other are adjusted to have a value close to the ratio of coefficients of thermal expansion of the optical waveguide substrate 21 in two axial directions (two axes including the Z-axis and the X-axis, or two axes including the Z-axis and the Y-axis) that are perpendicular to each other. As a specific example, when assuming that the optical waveguide substrate 21 (LN substrate) has the above-described coefficients of thermal expansion (a value of the ratio is 8), the coefficients of thermal expansion of the liquid crystal polymer substrate 22 are adjusted to be 7 ppm/° C. in a resin flowing direction and to be 60 ppm/° C. in a direction perpendicular to the resin flowing direction during molding by using a polyphenylene sulfide-based resin. The relative direction of the liquid crystal polymer substrate 22 with respect to the optical waveguide substrate 21 is set in such a manner that the direction in which the coefficient of thermal expansion is 7 ppm/° C. is parallel with the Z-axis (main axis P) of the optical waveguide substrate 21 (LN substrate) and the direction in which the coefficient of thermal expansion is 60 ppm/° C. is parallel with the X-axis direction or the Y-axis direction of the optical waveguide substrate 21 (LN substrate). According to this configuration, stress that occurs inside the optical waveguide substrate 21 due to a difference in a coefficient of thermal expansion may be reduced, and thus stability in characteristics accompanying a temperature variation may be improved.

The ratio of the coefficients of thermal expansion of the liquid crystal polymer substrate 22 in the two axial directions may not be completely equal to the ratio of the coefficients of thermal expansion of the two axial directions of the optical waveguide substrate 21, and a difference between the ratios of the coefficients of thermal expansion may be present within a range capable of obtaining characteristics that are not problematic in practical use.

It is preferable that the difference in a coefficient of thermal expansion between the optical waveguide substrate 11 and the liquid crystal polymer substrate 12 be small, but it is most important for the directions of the biaxial anisotropy of the coefficient of thermal expansion to be aligned (to overlap). It is more preferable to make the difference in the coefficient of thermal expansion between the optical waveguide substrate 11 and the liquid crystal polymer substrate 12 small in the axial direction of the two axes with a larger coefficient of thermal expansion.

The thickness of the liquid crystal polymer substrate 22 is made to be sufficiently large, for example, 50 μm or more, and preferably approximately 0.5 mm to 1.0 mm in order for an electric field of the microwaves generated by the electrodes 26, 27-1, and 27-2 to be largely leaked to the inside of the liquid crystal polymer substrate 22 and in order to reliably hold the optical waveguide substrate 21. There is no particular limitation to the upper limit of the thickness. In addition, in the liquid crystal polymer, a slight distribution of the coefficient of thermal expansion in a plate thickness direction may be present depending on molding conditions of the liquid crystal polymer. However, if the anisotropy of the coefficient of thermal expansion in the overall liquid crystal polymer substrate 12 is close to that of the optical waveguide substrate 21, even when a local distribution of the coefficient of thermal expansion is present at the inside of the liquid crystal polymer substrate 22, there is no problem with a characteristic aspect of a device.

The optical waveguide substrate 21 and the liquid crystal polymer substrate 22 are bonded and fixed to each other by the adhesive layer 24. As an adhesive that forms the adhesive layer 24, an ultraviolet-curable adhesive that is cured by irradiation of ultraviolet rays, or thermally curable adhesive that is cured by heating may be used.

It is preferable that the thickness of the adhesive layer 24 be sufficiently small in consideration of the necessity of improving reliability of the optical modulator 20. For example, the adhesive layer 24 is formed with a thickness of 20 μm or less, preferably 9 μm or less, and more preferably 1 μm or less. When the thickness exceeds 30 μm, as described above, the correcting of parallelism becomes difficult during bonding. In addition, generally, when an adhesive layer is formed with a small thickness, the bonding strength increases. Accordingly, when the adhesive layer 14 is thin, the optical waveguide substrate 21 and the liquid crystal polymer substrate 22 may be bonded and fixed to each other with strength sufficient for a certain degree having no problem with a reliability aspect. In addition, since the temperature is increased by ultraviolet irradiation or heating and lowered after being cured, stress occurs during the curing of the adhesive. However, as long as the thickness of the adhesive layer 24 is small, the occurrence of stress can be reduced. With regard to the bonding, the optical waveguide substrate 11 and the liquid crystal polymer substrate 12 are preferably subjected to a washing treatment or a surface treatment by an appropriate method in order for bonding strength to be sufficiently exhibited.

In a case where the thickness of the adhesive layer 24 is set to be larger than 1 μm, similar to the liquid crystal polymer substrate 22 (to make equivalent refractive index with respect to the microwaves small), it is necessary for the permittivity of the adhesive used for the adhesive layer 24 to be lower than the permittivity of the optical waveguide substrate 21. This is because when the thickness is larger than 1 μm, an effect of the adhesive layer 24 on the equivalent refractive index of the microwave is large. On the other hand, in a case where the thickness of the adhesive layer 24 is set to be 1 µm or less, since the effect of the adhesive layer 24 on the equivalent refractive index of the microwaves is negligible, even when the permittivity of the adhesive that is used for the adhesive layer 24 is higher than the permittivity of the optical waveguide substrate 21, there is no problem.

The package housing 23 is a member that accommodates portions including the optical waveguide substrate 21, the liquid crystal polymer substrate 22, and the respective electrodes 26, 27-1, and 27-2 in an isolation manner from the outside for prevention of breakage and securement of reliability, and the liquid crystal polymer substrate 22 is fixed and attached to a convex portion (base) provided on the inner bottom surface of the package housing 23. In FIG. 3, only a part of the bottom surface and the convex portion of the package housing 23 are illustrated.

A material of the package housing 23 is set to a resin material so as to realize cost reduction of the optical modulator 20. At this time, molding conditions of the resin material of the package housing 23 and the liquid crystal polymer substrate 22 are selected in order for a coefficient of thermal expansion of the liquid crystal polymer substrate 22 on a package housing 23 side and a coefficient of thermal expansion of the resin material used for the package housing 23 have values close to each other. As described above, it is necessary to mode the liquid crystal polymer substrate 22 in such a manner that the coefficient of thermal expansion on an optical waveguide substrate 21 side has anisotropy. However, the coefficient of thermal expansion may be allowed to vary in a sheet thickness direction by controlling the molding conditions. In addition, the liquid crystal polymer substrate 22 may be prepared in such a manner that the coefficient of thermal expansion has anisotropy on an optical waveguide substrate 21 side, and has isotropy on a package housing 23 side. According to these configurations, stress that occurs inside the optical waveguide substrate 21 when an environmental temperature varies may be reduced. Accordingly, cost reduction of the package housing 23 due to formation of the package housing 23 with a resin material may be realized without deteriorating the characteristics of the optical modulator 20.

As a specific example, for example, polycarbonate (coefficient of thermal expansion=70 ppm/° C.) or noryl (coefficient of thermal expansion=2.5 ppm/° C.) may be used as the resin material of the package housing 23. In a case of using polycarbonate, two-liquid thermally curable epoxy adhesive (coefficient of thermal expansion=$63 \times 10^{-6}$/K) may be used as the material of the liquid crystal polymer substrate 22. In a case of using noryl, ultraviolet-curable epoxy adhesive (coefficient of thermal expansion=$20 \times 10^{-6}$/K) may be used as the resin material of the liquid crystal polymer substrate 22.

In the invention, a method of fixing the liquid crystal polymer substrate 22 and the package housing 23 is not particularly limited, and for example, a bonding and fixing method using the same adhesive as the adhesive layer 24, a method in which the liquid crystal polymer substrate 22 is formed from a material having viscosity by heating, and the liquid crystal polymer substrate 22 is heated and fixed to the package housing 23, a method of mechanically fixing (for example, screw fastening) the liquid crystal polymer substrate 22 and the package housing 23, and the like are applicable to the fixing method.

The Mach-Zehnder optical waveguide 25 may be prepared by using, for example, a method in which a metal such as titanium (TI) is allowed to thermally diffuse to the inside of the optical waveguide substrate 21, a method in which atoms (in a case of the LN substrate, lithium (Li) atoms) inside the optical waveguide substrate 21 is exchanged with protons, a method in which the optical waveguide substrate 21 is formed in a ridge shape, and light is guided to the ridge portion, and the like.

The respective electrodes 26, 27-1, and 27-2 that are formed on the optical waveguide substrate 21 are electrodes that allow microwaves to travel inside the optical waveguide substrate 21 and modulate optical waves propagating inside the diverged optical waveguides 25-1 and 25-2. The signal electrode 26 is disposed between the diverged optical waveguides 25-1 and 25-2, and the ground electrodes 27-1 and 27-2 are disposed to face the signal electrode 26 with the diverged optical waveguides 25-1 and 25-2 being interposed therebetween, respectively. According to this disposition, at the inside of the diverged optical waveguides 25-1 and 25-2, an electric field of the microwaves has a main component in the direction of the main axis P. As described above, the speed matching is configured to be realized by the liquid crystal polymer substrate 22 provided on a lower side of the optical waveguide substrate 21, and thus the respective electrodes 26, 27-1, and 27-2 are configured to be directly formed on the optical waveguide substrate 21. Accordingly, voltage reduction of a drive voltage may be realized without a decrease in intensity of the electric field of the microwaves applied to the diverged optical waveguides 25-1 and 25-2. A modulation voltage that is input to the respective electrodes 26, 27-1, and 27-2 is supplied from an external high-frequency power supply 30.

Hereinbefore, the embodiments of the invention have been described in detail with reference to the attached drawings. Specific configurations are not limited to the above-described configurations, and various design changes and the like may be made within a range not departing from the gist of the invention.

For example, specific configurations of the Mach-Zehnder optical waveguide 15 or 25, and the respective electrodes 16, 17-1, 17-2, 26, 27-1, and 27-2 are not limited to the above-described configuration and may be appropriately changed as necessary.

In addition, in the liquid crystal polymer substrates 12 and 22, although the permittivity and the imaginary part of complex permittivity of the liquid crystal polymer substrates 12 and 22 are set to be lower than that of the optical waveguide substrates 11 and 21 in order to ensure the characteristics of the device, it is allowed to increase the permittivity or the complex permittivity by appropriately mixing with a filler or an aggregate for adjustment of a coefficient of thermal expansion or mechanical strength, as long as the characteristic degradation of the device is within a range of practical use.

REFERENCE SIGNS LIST 10, 20: Optical modulator
11, 21: Optical waveguide substrate
12, 22: Liquid crystal polymer substrate
13: Holding substrate
23: Package housing
14, 24: Adhesive layer
15, 25: Mach-Zehnder optical waveguide
15-1, 15-2, 25-1, 25-2: Diverged optical waveguide
15-3, 25-3: Input waveguide
15-4, 25-4: Output waveguide
16, 26: Signal electrode
17-1, 17-2, 27-1, 27-2: Ground electrode

INDUSTRIAL APPLICABILITY

According to an optical waveguide device of the invention, stress that occurs inside an optical waveguide substrate due to a difference in a coefficient of thermal expansion may be reduced.

We claim:

1. An optical waveguide device, comprising:
   an optical waveguide substrate having a thickness of 30 μm or less; and
   a holding substrate that holds the optical waveguide substrate,
   wherein the optical waveguide substrate and the holding substrate are bonded to each other by an adhesive layer,
   the holding substrate is a substrate formed from a liquid crystal polymer having permittivity lower than that of the optical waveguide substrate,
   coefficients of thermal expansion of the optical waveguide substrate and the holding substrate have anisotropy in each substrate plane,
   a relative direction between the optical waveguide substrate and the holding substrate is adjusted in such a manner that each of the axes with a larger coefficient of thermal expansion and with a smaller coefficient of thermal expansion in the anisotropic axial directions of the optical waveguide substrate are aligned with each of the axes with a larger coefficient of thermal expansion and with a smaller coefficient of thermal expansion in the anisotropic axial directions of the holding substrate.

2. The optical waveguide device according to claim 1, wherein the holding substrate is attached to a housing formed from a resin.

3. The optical waveguide device according to claim 2, wherein a coefficient of thermal expansion of the holding substrate formed from the liquid crystal polymer on a side coming into contact with the housing is substantially the same as a coefficient of thermal expansion of the housing.

* * * * *